Figure 1:
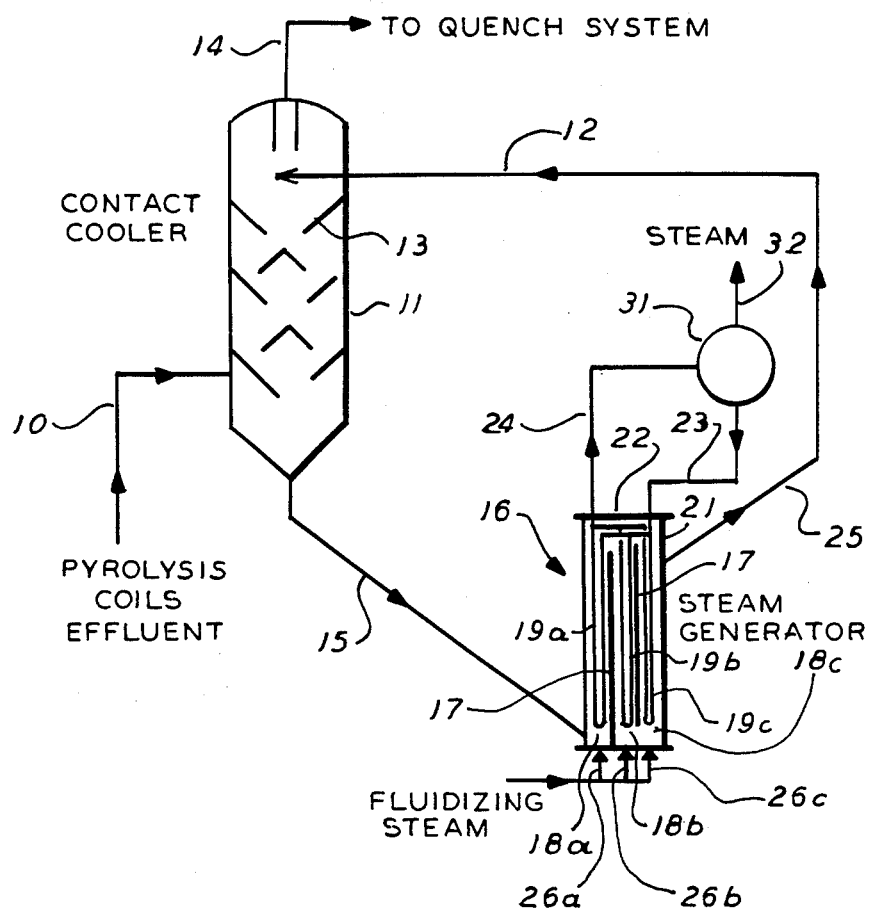

United States Patent [19]

Tsao

[11] Patent Number: 4,714,109
[45] Date of Patent: Dec. 22, 1987

[54] GAS COOLING WITH HEAT RECOVERY

[76] Inventor: Utah Tsao, 1887 Kennedy Blvd., Jersey City, N.J. 07305

[21] Appl. No.: 916,011

[22] Filed: Oct. 3, 1986

[51] Int. Cl.⁴ .............................................. F25D 15/00
[52] U.S. Cl. ................................ 165/104.18; 62/57; 62/467
[58] Field of Search ................. 165/104.18; 62/55.5, 62/467, 57

[56] References Cited

U.S. PATENT DOCUMENTS

| | | | |
|---|---|---|---|
| 3,117,064 | 1/1964 | Friedrich | 165/104.18 |
| 3,488,042 | 1/1970 | Brzozowski et al. | 165/104.18 |
| 3,492,740 | 3/1970 | Geipel et al. | 165/104.18 |
| 3,627,036 | 12/1971 | Gilbert | 165/104.18 |
| 3,630,501 | 12/1971 | Shabaker | 165/104.18 |
| 4,104,883 | 8/1978 | Naef | 165/104.18 |
| 4,182,749 | 1/1980 | Green et al. | 62/55.5 |
| 4,483,276 | 11/1984 | Lomas et al. | 165/104.18 |

Primary Examiner—Ronald C. Capossela
Attorney, Agent, or Firm—Elliot M. Olstein

[57] ABSTRACT

Rapid cooling of a gas with simultaneous heat recovery is accomplished by directly contacting the gas with finely divided solids, and then recovering heat from the finely divided solids by passing the solids through at least two separate compartments where the solids are maintained as a fluidized bed, with heat being recovered therefrom by indirect heat transfer between a heat transfer fluid and the heated solids in the fluidized beds. Pyrolysis effluent may be rapidly quenched while providing for effective heat recovery.

19 Claims, 2 Drawing Figures

GAS COOLING WITH HEAT RECOVERY

This invention relates to cooling of a hot gas, and more particularly to recovering heat during cooling of a hot gas. Still more particularly, this invention relates to quenching of a pyrolysis effluent with recovery of heat therefrom.

In many cases, it is necessary to rapidly quench a gas while simultaneously recovering heat therefrom. For example, in the production of ethylene and lower olefins, by thermal cracking, the effluent from the pyrolysis tubes of a pyrolysis heater is generally at a temperature in excess of 1200° F., and most generally a temperature in the order of 1450°-1500° F. In the pyrolysis process, it is necessary to rapidly cool down the pyrolysis effluent (quenching of the effluent) so as to minimize additional cracking. In most cases, such cooling is accomplished in a transfer line exchanger wherein the pyrolysis effluent is cooled down to a temperature of about 800° F. by generation of high pressure steam at a pressure of about 1500 psig.

Although a transfer line exchanger effectively rapidly cools the pyrolysis effluent, there are numerous problems with such exchangers. Thus, for example, a pyrolysis effluent often contains a small amount of unstable heavy hydrocarbons which tend to deposit as coke on the surface of the cooling tubes of the transfer line exchanger. The buildup of coke on the tubes increases the pressure drop across the transfer line exchanger, which increases the back pressure at the outlet of the pyrolysis heater thereby reducing the selectivity of ethylene production. The coke deposit also has an insulation effect on the cooling tubes and thus the generation of high pressure steam is reduced. Accordingly, the transfer line exchanger has to be taken off line to be mechanically decoked or chemically cleaned by a mixture of air and steam. This reduces the production capacity of the plant.

The present invention is directed to improving the methodology for rapidly cooling a hot gas, while enabling effective heat recovery therefrom.

In accordance with one aspect of the present invention, there is provided a process for cooling of a hot gas while recovering heat therefrom wherein the hot gas is contacted with finely divided solids, preferably with the solids being present as a dilute phase, with such contacting resulting in rapid cooling of the gas and heating of the solids. After separating the heated solids from the cooled gas, heat is recovered from such heated solids by passing the solids through at least two zones wherein the solids are maintained as a fluidized bed, and heat is recovered therefrom by heat exchange with a heat transfer fluid.

The cooled solids may then be reused for cooling of the hot gas.

By using finely divided solids for cooling of the hot gas, the gas can be cooled with a minimization of back pressure.

In addition, by recovering heat from the solids in a fluidized bed, in at least two zones or compartments, the average temperature difference between the solids and the heat exchange fluid is increased. This permits a reduction in the total required cooling surface.

The gas which is subjected to cooling by contact with finely divided solids may include solids prior to such contacting, such as, for example, a pyrolysis effluent produced by cracking with hot solids.

In accordance with a preferred aspect of the present invention, the gas which is cooled by contact with the finely divided solids is a pyrolysis effluent, with the finely divided solids effecting rapid cooling of the pyrolysis effluent to a temperature below cracking temperatures so as to increase selectivity to ethylene.

Figure 2:
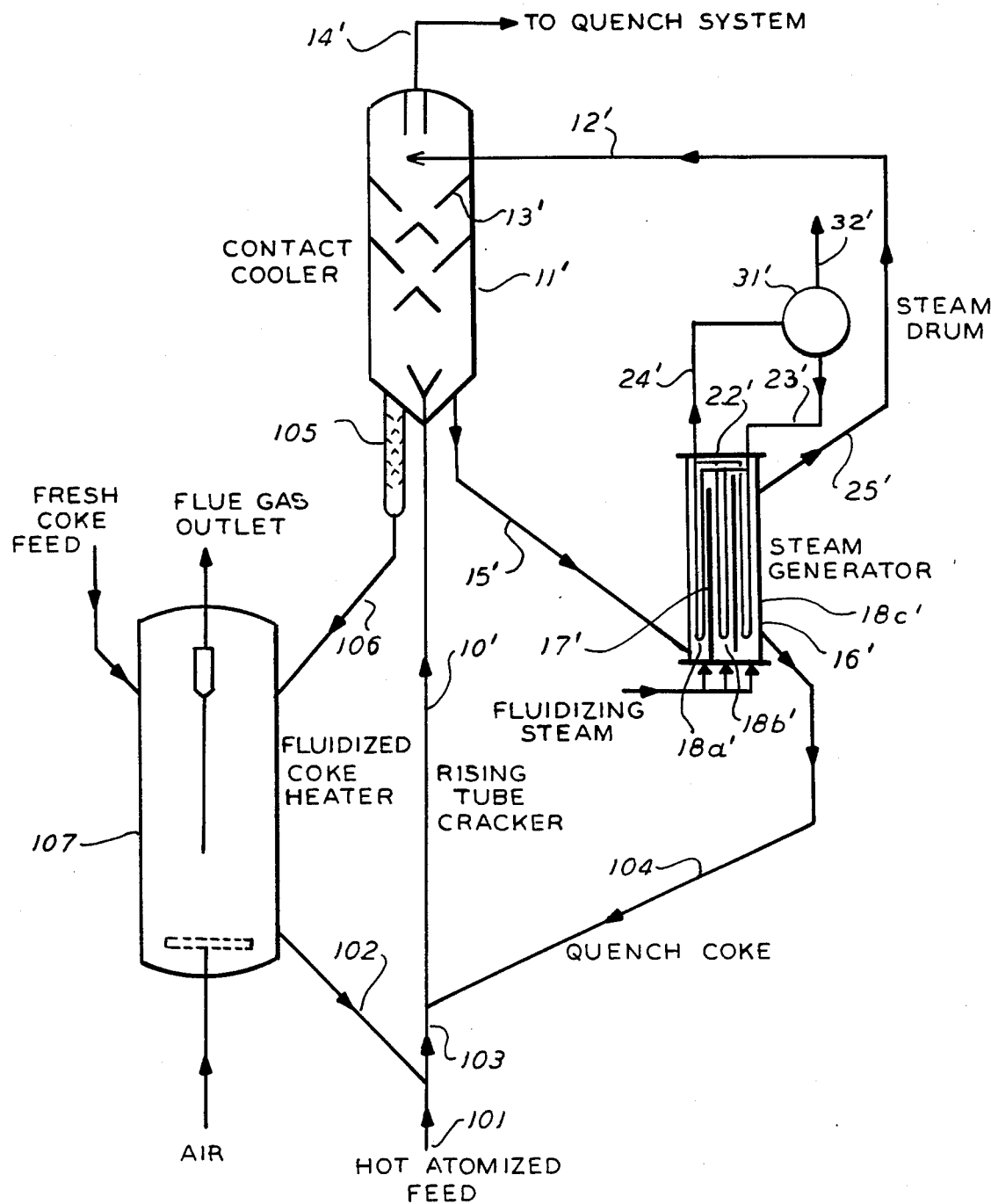

The invention will be further described with respect to the accompanying drawing, wherein:

FIG. 1 is a simplified schematic flow diagram of a preferred embodiment of the invention; and FIG. 2 is a simplified schematic representation of the use of the present invention for cooling an effluent from a different type of pyrolysis process.

Referring now to FIG. 1 of the drawing, a pyrolysis effluent from a pyrolysis heater, in line 10, is introduced into a cooling vessel, schematically generally indicated as 11, wherein the gas is rapidly cooled by direct heat transfer with finely divided solids introduced into vessel 11 through line 12.

The cooling vessel 11 is preferably provided with baffles, schematically generally indicated as 13, to increase contact between the solids and gas in cooler 11. The gas is cooled by countercurrent contact with the finely divided solids, with the finely divided solids being maintained as a dilute phase in vessel 11.

In accordance with a particularly preferred embodiment, the finely divided solids have a mean particle size in the order of from 200–500 microns, and the solids introduced into the top of the cooling vessel 11, through line 12, cascade down over the baffles forming curtains of solids for the gaseous effluent to pass through. In the cooling vessel 11, there is a minimum drop in pressure, which minimizes the back pressure at the outlet of the pyrolysis coils from which the pyrolysis effluent in line 10 is withdrawn.

As a result of the direct countercurrent contact between the solids, as a dilute phase, and the gas, the gas is rapidly cooled to a temperature below the cracking temperature, with the cooled gas being withdrawn from cooling vessel 11 through line 14. There may be a small amount of fines in the gas withdrawn through line 14, and such fines may be separated by procedures known in the art. Thus, for example, in the case where the pyrolysis effluent is to be further cooled by direct contact with a quench liquid, which is comprised of a circulating heavy oil, such fines would be trapped in the quench system and would not affect the quality of the oil for combustion.

In accordance with a particularly preferred exbodiment, the solids which are employed for cooling of the gas in vessel 11 are coke fines.

The amount of solids which are introduced into cooler 11 through line 12 is controlled so as to provide the requisite reduction in temperature of the pyrolysis effluent, and to provide heated solids, which are withdrawn from vessel 11 through line 15, which are at a temperature suitable for effective heat recovery.

The heated solids in line 15 are introduced into a heat recovery vessel, schematically generally indicated as 16, with the vessel 16 preferably being a steam generator wherein heat is recovered from the solids by production of high pressure steam.

The generator 16 is divided into several compartments by baffles 17 in order to create separate compartments or zones in which the finely divided solids are maintained as a fluidized bed. As particularly shown, the vessel 16 is divided by baffle 17 into three compartments, designated as 18A, 18B and 18C.

Each of the fluidized bed compartments 18A, 18B, and 18C is provided with means for passing a heat exchange or heat transfer fluid in an indirect heat transfer relationship with the solids in each of the compartments. As particularly shown, the compartments 18A, 18B and 18C are provide with pipes or coils 19A, 19B and 19C, each of which is connected to an inlet header 21, and an outlet header 22.

Heat transfer fluid is introduced into the inlet header 21 through inlet line 23, and heated heat transfer fluid is withdrawn from the outlet header 22 through line 24.

In this manner, heat transfer fluid is separately passed through each of the compartments 18A, 18B and 18C.

The heated solids in line 15 are introduced into the first compartment 18A, and such heated solids then flow over the baffle 17 into the compartment 18B and thereafter flow under the baffle 17 into the compartment 18C for subsequent removal from the vessel 16 through line 25.

The solids are maintained in a fluidized state (as a dense fluidized bed) in each of the compartments 18A, 18B and 18C by introduction of a fluidizing gas, such as steam, through lines 26A, 26B and 26C.

By partitioning the vessel 16 into different compartments, each of which has separate heat transfer pipes, and each of which includes the heated solids, in a fluidized state, the average temperature difference between the solids, and the heat transfer fluid in the pipes is increased. In this manner, heat can be more effectively recovered from the heated solids, which reduces the total required cooling surface in the vessel 16.

It is to be understood that, although the embodiment has been described with reference to three fluidized beds in a single vessel, it is possible to employ two fluidized beds, or more than three fluidized beds. In addition, it is possible to provide the fluidized beds in separate vessels, rather than in a single vessel as shown.

The heated heat transfer fluid in line 24, which, in accordance with a preferred embodiment, is a mixture of steam and water, is introduced into a steam drum 31 wherein steam is removed through line 32, and water is recirculated to the vessel 16 through line 23.

The cooled solids withdrawn from vessel 16 through line 25 may be reemployed in line 12 for cooling of a pyrolysis effluent in cooling vessel 11.

The fluidizing gas introduced into the vessel 16 through lines 26A, 26B and 26C, which is preferably steam, may be employed to circulate the solids withdrawn from the vessel 16 through line 25 to the cooling vessel 11.

Thus, by proceeding in accordance with the present invention, it is possible to effect rapid cooling of the gas, while also providing for effective heat recovery. For example, if the recovery vessel 16 is partitioned into four compartments of equal cooling surface, the average difference in temperature between the solids and the heat transfer fluid circulating through the pipes in the vessel is about one-half of that which would be required if the solids were present as a single fluidized bed within the vessel. This permits a corresponding reduction in the total required cooling surface for the heat recovery vessel 16.

In a representative operation, the pyrolysis effluent in line 10 comprised of about 22,300 lbs./hr. of hydrocarbon and 13,300 lbs./hr. of steam, at a temperature of 1445° F. and a pressure of 15 psig is cooled to a temperature of 780° F. in line 14 by direct contact with finely divided coke which is introduced through line 12 at a temperature of 750° F. and a rate of 61,100 lbs./hr.

Heated coke fines at a temperature of 1400° F. 15 are introduced into a steam generator 16 wherein the solids are fluidized by use of 1,000 lbs./hr. of low pressure steam to maintain a steam velocity in the fluidized beds of about 0.4 ft./second. The steam generation vessel 16 contains 632 sq.ft. of two-inch pipes, equally divided between four compartments, and is capable of generating about 28,400 lbs./hr. of steam at a temperature of 600° F. and a pressure of 1550 psig. The four compartments are partitioned into equal cooling surface areas of about 158 sq. ft. each, produce an average temperature difference between the solids and steam of about 312° F., as compared to an average temperature difference of 150° F. which would be achieved by use of a single fluidized bed.

A cooling surface of 632 sq. ft. is approximately equal to the 607 sq. ft. of cooling surface employed in transfer line exchangers, except that the construction of the equipment in accordance with the present invention is much simpler than a transfer line exchanger.

It is to be understood that further improvements in cooling efficiencies can be achieved by employing more than one contact cooler 11, whereby it is possible to increase the number of compartments in each steam generator, which provides a further improvement in cooling efficiency.

It is also to be understood that appropriate lines for introduction of makeup solid fines and makeup water, which are not shown, would be utilized with the present invention.

A further modification is shown in FIG. 2 wherein portions similar to FIG. 1 are designated by like prime numerals.

Referring to FIG. 2, a hot atomized pyrolysis feed, in line 101, such as a hydrocarbon feed is directly contacted with heated solids, such as coke particles, in line 102. The temperatures and quantities of the respective streams are such that the resulting mixture in line 103 is at a temperature which effects rapid cracking of the pyrolysis feed; e.g., a temperature of 1600° F. Thus, cracking (pyrolysis) is rapidly effected in line 103 to produce a pyrolysis effluent which is initially quenched by the addition of cooled solids in line 104, e.g., to a temperature of 1400° F. The cooled solids in line 104 are obtained from steam generator 16'.

The partially quenched pyrolysis effluent in line 10', which is an admixture of gas and solids, is then introduced into vessel 11' for cooling of the gas, as described with reference to FIG. 1.

A portion of the solids introduced into vessel 11' are withdrawn through line 15' for recovery of heat therefrom, as described with reference to FIG. 1.

Another portion of the solids introduced into vessel 11' are withdrawn therefrom through a stripping section, designated as 105 and the withdrawn solids, in line 106 are introduced into a fluidized heater 107 for heating the solids, by procedures known in the art to a temperature suitable for cracking of the pyrolysis feed, as hereinabove described.

Thus, the procedure of the present invention is applicable to a wide variety of processing procedures.

The present invention is particularly advantageous in that it is possible to effect rapid cooling of the gas, and in particular, a pyrolysis effluent, while eliminating the problems which are normally encountered in the use of transfer line exchangers. Thus, by proceeding in accordance with the present invention, it is possible to eliminate the gradual buildup of back pressure and the shutdown time for cleaning which are normally encountered in using transfer line exchangers.

It is to be understood that, in practicing the present invention for pyrolysis of hydrocarbons to produce lower boiling hydrocarbons, the processes and equipment generally available in the art may be employed for providing a pyrolysis effluent for quenching in accordance with the present invention. As known in the art, ethylene may be produced from various petroleum fractions.

Although the present invention is particularly applicable to rapid quenching of a pyrolysis effluent, it is to be understood that the scope of the invention is not limited to such a process. Thus, the present invention is generally applicable to rapid cooling of gases with simultaneous recovery of heat therefrom.

Numerous modifications and variations of the present invention are possible in light of the above teachings and, therefore, within the scope of the appended claims, the invention may be practiced otherwise than as particularly described.

What is claimed is:

1. A process for cooling a gas and recovering heat therefrom, comprising:
    contacting a hot gas with finely divided solids to cool the gas and heat the solids; separating the gas and heated solids; passing heated solids through at least two zones; maintaining the solids as a fluidized bed in said at least two zones; and recovering heat from the heated solids in the at least two zones by heat exchange with a heat transfer fluid.

2. The process of claim 1 wherein the finely divided solids are maintained as a dilute phase in contacting said hot gas.

3. The process of claim 2 wherein the heat transfer fluid is passed in an indirect heat exchange relationship with the solids in the at least two zones.

4. The process of claim 3 wherein said at least two zones are in a single vessel.

5. The process of claim 4 wherein heat is recovered from the heated solids in the at least two zones by generation of steam.

6. The process of claim 1 wherein the hot gas includes solids prior to contacting with the finely divided solids.

7. The process of claim 1 wherein said finely divided solids have a mean particle size from about 200 microns to about 500 microns.

8. A process for quenching a pyrolysis effluent and recovering heat therefrom, comprising:
    quenching a pyrolysis effluent by direct contact with finely divided solids; separating heated finely divided solids from the pyrolysis effluent; passing the heated finely divided solids through at least two zones; maintaining said finely divided solids as a fluidized bed in said at least two zones; and recovering heat from the heated solids in the at least two zones by indirect heat transfer to generate steam.

9. The process of claim 8 wherein the finely divided solids are coke fines.

10. The process of claim 9 wherein the coke fines are recovered from the at least two zones and recycled to said quenching.

11. The process of claim 8 wherein the pyrolysis effluent includes solids.

12. The process of claim 8 wherein the pyrolysis effluent is at a temperature in excess of about 1200° F.

13. The process of claim 12 wherein the pyrolysis effluent is at a temperature of about 1450° F. to about 1500° F.

14. In a process for thermal cracking a hydrocarbon to produce lower olefins wherein a pyrolysis effluent is produced, the improvement comprising:
    quenching said pyrolysis effluent by direct contact with finely divided solids;
    separating heated finely divided solids from said pyrolysis effluent;
    passing the heated finely divided solids through at least two zones;
    maintaining said finely divided solids as a fluidized bed in said at least two zones; and
    recovering heat from said heated solids in said at least two zones by indirect heat transfer to generate steam.

15. The process of claim 14 wherein said finely divided solids are coke fines.

16. The process of claim 15 wherein said coke fines are recovered from the at least two zones and recycled to said quenching.

17. The process of claim 14 wherein the pyrolysis effluent includes solids.

18. The process of claim 14 wherein said pyrolysis effluent is at a temperature in excess of about 1200° F.

19. The process of claim 18 wherein said pyrolysis effluent is at a temperature from about 1450° F. to about 1500° F.

* * * * *